(12) United States Patent
Moradnia et al.

(10) Patent No.: US 11,548,571 B2
(45) Date of Patent: Jan. 10, 2023

(54) VEHICLE UNDERCOVER

(71) Applicant: Honda Motor Co., Ltd., Tokyo (JP)

(72) Inventors: Pirooz Moradnia, Dublin, OH (US); Derik Thomas Voigt, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 44 days.

(21) Appl. No.: 17/141,627

(22) Filed: Jan. 5, 2021

(65) Prior Publication Data
US 2022/0212730 A1 Jul. 7, 2022

(51) Int. Cl.
*B62D 35/02* (2006.01)
*B60K 13/04* (2006.01)

(52) U.S. Cl.
CPC .............. *B62D 35/02* (2013.01); *B60K 13/04* (2013.01)

(58) Field of Classification Search
CPC ..... B60K 13/04; B60R 13/04; B60R 13/0861; B62D 35/02
USPC .................................................. 296/38, 180.1
See application file for complete search history.

(56) References Cited

U.S. PATENT DOCUMENTS

| | | | |
|---|---|---|---|
| 6,126,391 A | 10/2000 | Atraghji et al. | |
| 6,796,402 B1 | 9/2004 | Wagner | |
| 8,517,451 B2* | 8/2013 | Kakiuchi | B62D 35/02 296/180.1 |
| 8,668,245 B2* | 3/2014 | Kakiuchi | B62D 35/02 296/180.1 |
| 9,227,677 B2 | 1/2016 | Hillstroem et al. | |
| 10,137,946 B2 | 11/2018 | Schoen | |
| 2014/0251241 A1* | 9/2014 | Tajima | F01P 11/10 123/41.56 |
| 2015/0002195 A1 | 1/2015 | Englekirk | |
| 2016/0221615 A1* | 8/2016 | Ito | B60K 11/06 |
| 2018/0093562 A1* | 4/2018 | Murata | F01N 3/10 |

FOREIGN PATENT DOCUMENTS

| | | | |
|---|---|---|---|
| DE | 102006026098 A1 | 12/2007 | |
| DE | 102008003511 A1 * | 6/2009 | ............ B60K 11/06 |
| DE | 102008024786 A1 | 11/2009 | |
| DE | 102009036758 A1 | 3/2010 | |
| DE | 102008059021 A1 | 5/2010 | |
| EP | 1151909 A2 | 11/2001 | |
| EP | 2501604 | 9/2012 | |
| EP | 3202647 A1 | 2/2017 | |

(Continued)

OTHER PUBLICATIONS

"C7 Underbody Photos" [online] (Accessed Apr. 8, 2020); Retrieved from https://www.stingrayforums.com/threads/c7-underbody-photos.22721/#lg=thread-22721&slide=9 (5 pp).

(Continued)

*Primary Examiner* — Jason S Daniels
(74) *Attorney, Agent, or Firm* — Plumsea Law Group, LLC

(57) ABSTRACT

An undercover for attachment to an underside of a vehicle, the undercover including a plurality of deflectors disposed along an axis of the undercover, the plurality of deflectors being spaced apart to thereby define a predetermined gap between adjacent deflectors, and wherein each of the plurality of deflectors includes a plurality of apertures extending therethrough and configured to allow airflow along the underside of the vehicle.

20 Claims, 5 Drawing Sheets

(56) References Cited

FOREIGN PATENT DOCUMENTS

FR        3059977 A1    12/2016

OTHER PUBLICATIONS

"Shine Speedshop" [online] (Accessed Apr. 8, 2020); Retrieved from https://www.shinespeedshop.com/copy-of-hot-rods (5 pp).
"Managing heat with a flat underbody" [online] miataturbo.net; Retrieved from https://www.miataturbo.net/race-prep-75/managing-heat-flat-underbody-69108/ [retrieved on Oct. 8, 2020].

* cited by examiner

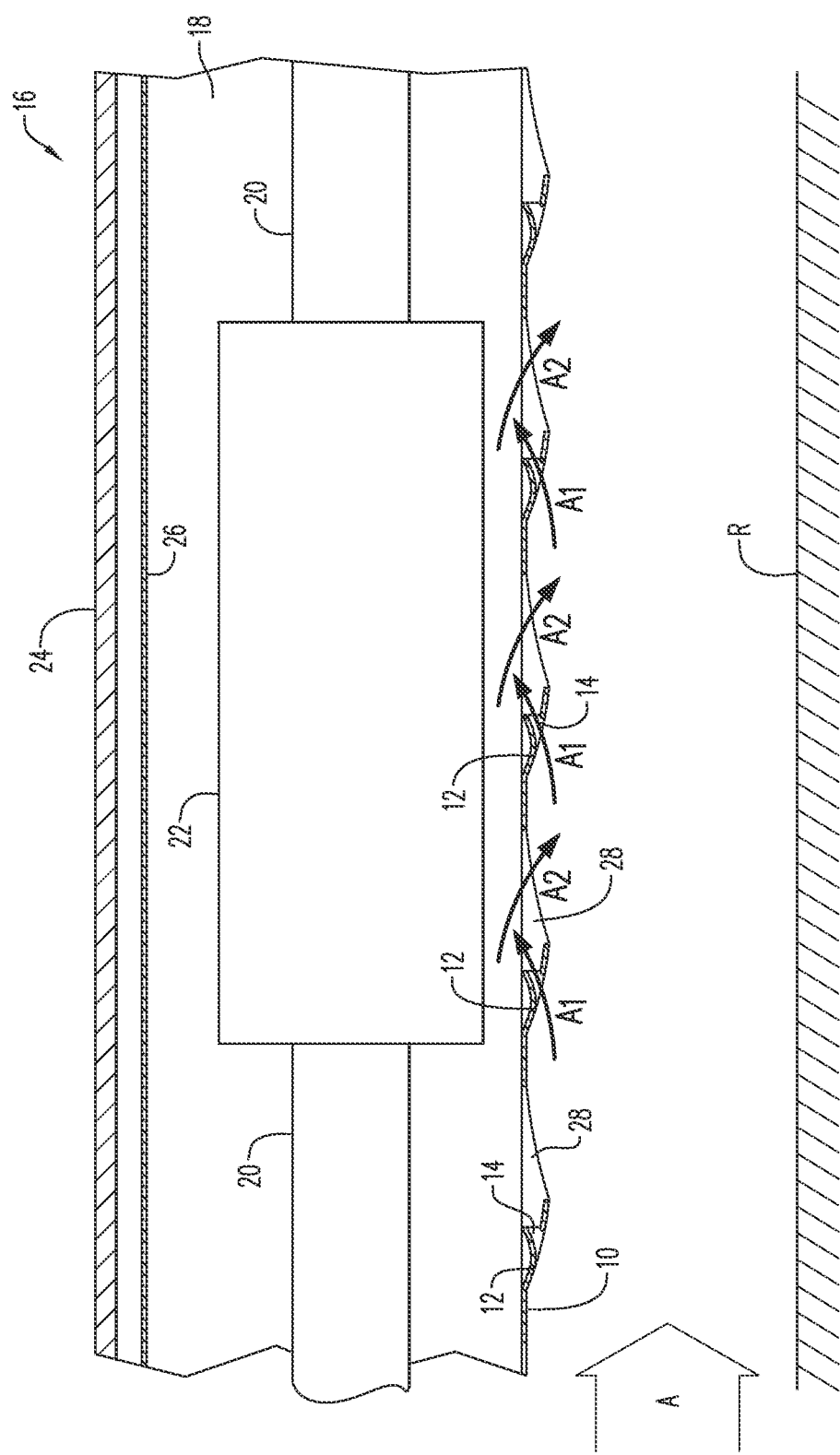

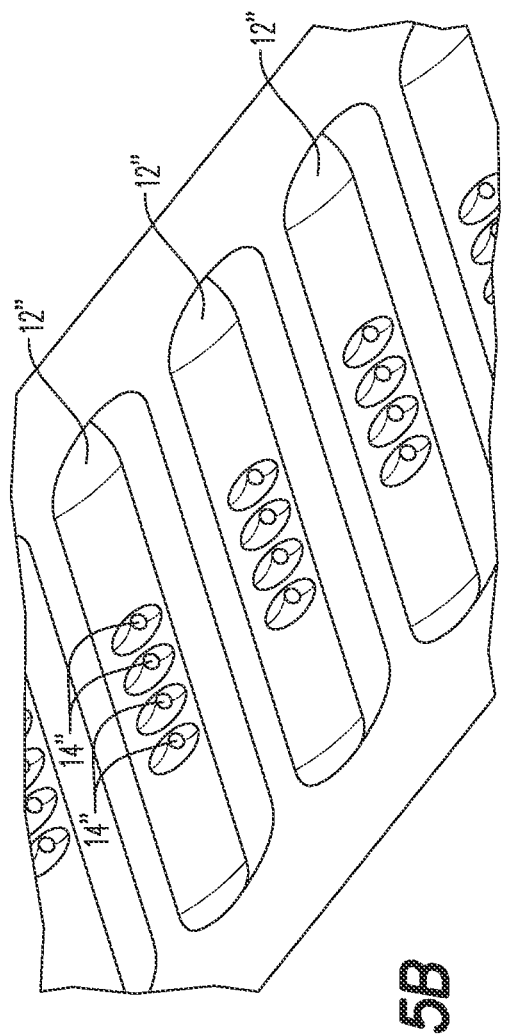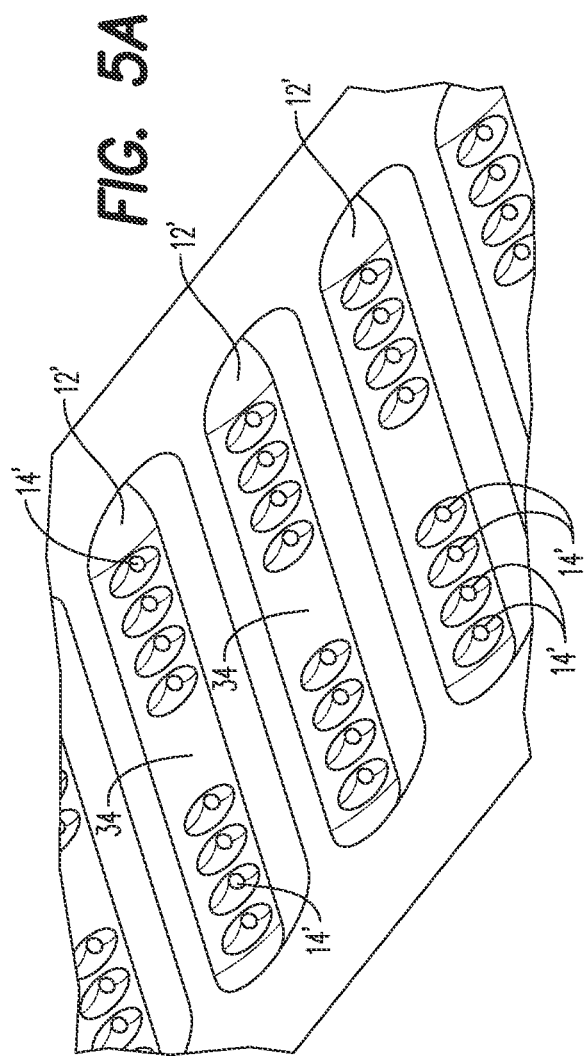

VEHICLE UNDERCOVER

BACKGROUND

The present disclosure relates to a vehicle undercover and, more particularly, to a vehicle undercover including a plurality of openings configured for airflow across one or more vehicle components.

As one skilled in the art will appreciate, the aerodynamics of a vehicle are improved when air can flow smoothly over and/or under the vehicle when it is in motion. In furtherance of this objective, plates or covers over a portion of the vehicle undercarriage have been used to improve aerodynamics and to provide protection to the vehicle components from road debris and the elements, i.e., rain, mud, snow, and the like. Such plates generally do not cover the exhaust system however because that would limit the convective heat transfer capabilities of the exhaust system when the vehicle is in motion.

There is a need in the art for a system and method that provides an undercover for a vehicle that allows the vehicle one or more vehicle components to breath, i.e., air flow thereover, while still providing a substantially smooth undercarriage to improve the aerodynamic movement of the vehicle.

SUMMARY OF THE INVENTION

A vehicle undercover that includes a plurality of deflectors positioned directly beneath the exhaust system. The deflectors include a plurality of openings and gap or spacing is provided between adjacent deflectors, thereby allowing the undercover to "breath" as air flows in from the front of the deflector and passes into the space housing the exhaust pipe. The hot air heated by the exhaust pipe then exits from the gap between the back end of the deflector and the next adjacent deflector.

In one aspect, the disclosure provides a vehicle including a vehicle body having an undercarriage; and an underbody cover attached to the undercarriage of the vehicle body, the underbody cover having a plurality of spaced deflectors defining a predetermined gap between adjacent ones of the plurality of deflectors. Further, each of the plurality of deflectors includes a plurality of apertures extending therethrough and configured to allow airflow through the underbody cover.

A system and method for cooling a vehicle exhaust system, the vehicle exhaust system including at least one exhaust component disposed within an exhaust cavity on an underbody of a vehicle. The method includes providing a vehicle undercover having a plurality of spaced deflectors defining a predetermined gap between adjacent deflectors, each of the plurality of deflectors including a plurality of apertures extending therethrough, and positioning the vehicle undercover beneath at least one exhaust pipe and attaching the vehicle undercover to the underbody of the vehicle.

In another aspect, the disclosure provides an undercover for attachment to an underside of a vehicle, the undercover including a plurality of deflectors disposed along an axis of the undercover, the plurality of deflectors being spaced apart to thereby define a predetermined gap between adjacent deflectors, and at least one of the plurality of deflectors includes one or more apertures extending therethrough.

Other systems, methods, features and advantages of the disclosure will be, or will become, apparent to one of ordinary skill in the art upon examination of the following figures and detailed description. It is intended that all such additional systems, methods, features and advantages be included within this description and this summary, be within the scope of the disclosure, and be protected by the following claims.

BRIEF DESCRIPTION OF THE DRAWINGS

The disclosure can be better understood with reference to the following drawings and description. The components in the figures are not necessarily to scale, emphasis instead being placed upon illustrating the principles of the disclosure. Moreover, in the figures, like reference numerals designate corresponding parts throughout the different views.

FIG. 3 is a cross-sectional schematic illustrating a vehicle undercover disposed on the underbody of a vehicle in accordance with the exemplary embodiment of the disclosure.

FIG. 5A is a front, bottom perspective view of a vehicle undercover according to a further exemplary embodiment of the disclosure.

FIG. 5B is a front, bottom perspective view of a vehicle undercover according to another further exemplary embodiment of the disclosure.

DETAILED DESCRIPTION

The disclosure herein is directed to a vehicle undercover for improving under-vehicle aerodynamics while providing targeted cooling air flow toward one or more vehicle components, such as, for example, the exhaust system. In an exemplary embodiment, the vehicle undercover includes a plurality of deflectors positioned beneath the exhaust system and sufficiently spaced for air flow in between adjacent deflectors. In an illustrative example, the deflectors may include a plurality of openings that allow air to flow from the front underside of the deflector to the rear topside of the deflector, thereby targeting the air flow into an underbody cavity housing the vehicle component to be cooled. As such, when the vehicle is moving in a forward direction, ambient air will enter from the front of the deflector, flow into the cavity space to cool the exhaust piping or other exhaust components housed therein, and then the heated air will exit from one or more of the gaps positioned rearward of the deflector relative to the forward movement of the vehicle. The vehicle undercover also provides a substantially smoother surface than a conventional vehicle undercarriage with an exposed exhaust system and thus, aerodynamic drag is reduced to improve overall vehicle performance.

Figure 1:
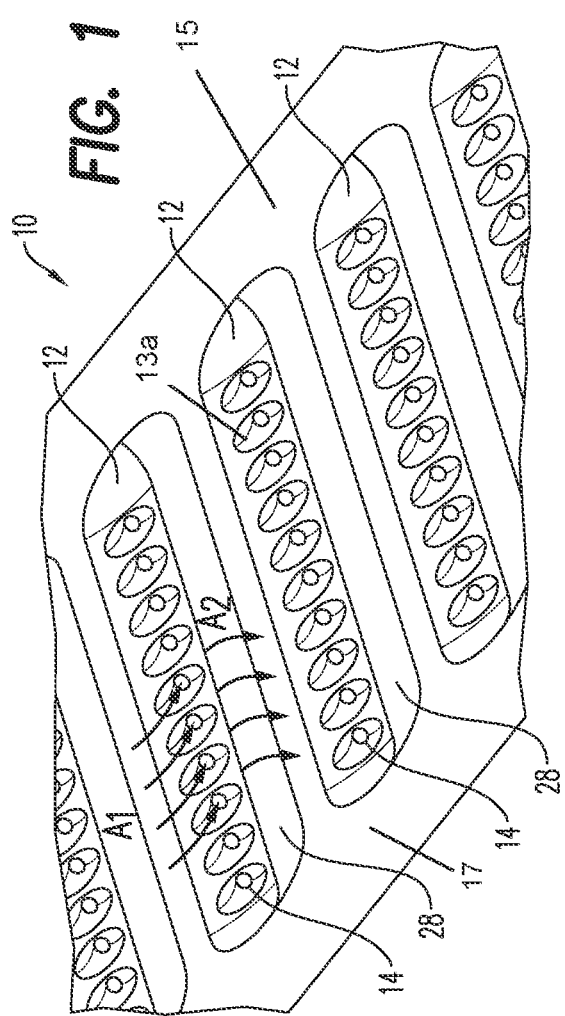
FIG. 1 is a front, bottom perspective view of a vehicle undercover according to an exemplary embodiment of the disclosure.
Figure 2:
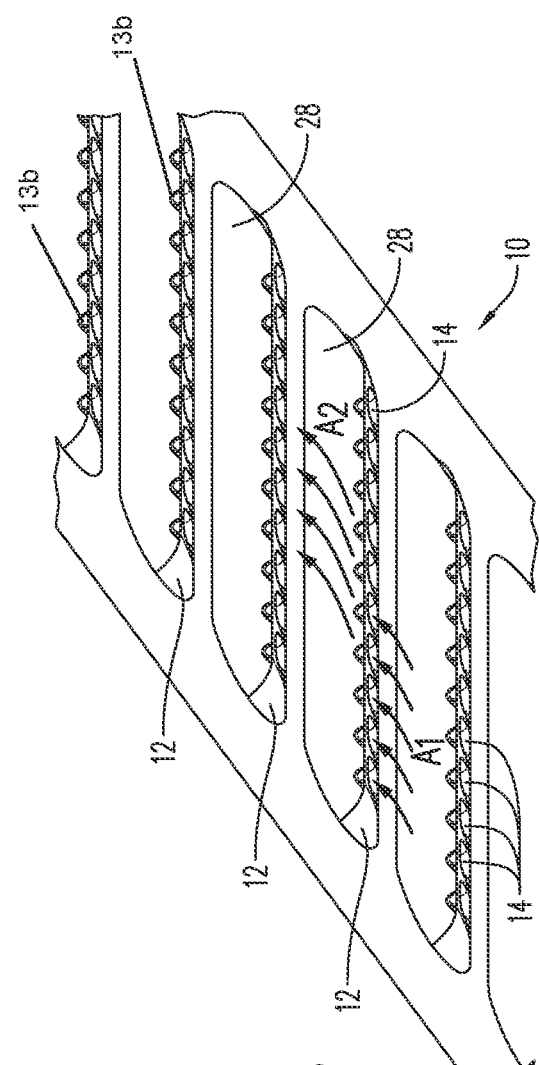
FIG. 2 is a rear, bottom perspective view of the vehicle undercover shown in FIG. 1.

An underbody cover in accordance with an exemplary embodiment of the disclosure is shown generally by reference numeral 10 in FIGS. 1 and 2. The underbody cover 10 includes a plurality of successive deflectors 12, each of which includes a plurality of scoop-like shaped or hooded air passages 13 having an opening or aperture 14 therethrough. The passages 13 have a generally scooped shape 13a on the forward side of the underbody cover, as shown in FIG. 1, and a hooded shape 13b on the rear side of the underbody cover 10, as shown in FIG. 2. The underbody cover 10 includes opposing side body portions 15, 17 which define gaps or spacings 28 between adjacent deflectors 12. The through openings 14 may have any suitable shape such as circular, square, triangular, pentagram, hexagon, or rectangular, and be sized appropriately depending on the environment and cooling required.

Referring also to FIG. 3, the underbody cover 10 is disposed below the undercarriage of a vehicle 16, and more particularly, below an exhaust cavity 18 housing exhaust components such as, for example, an exhaust pipe 20 and a muffler 22. The exhaust cavity 18 is formed beneath the vehicle floor 24 and generally surrounded by a heat shield 26. When the vehicle 16 is in motion over a road surface R, air will flow beneath the vehicle 16 in a direction generally indicated by the airflow arrow A. When the air flow passes over the underbody cover 10, the cooler, ambient airflow shown by arrow $A_1$ will enter the openings 14 in each of the deflectors 12 and be directed into the exhaust cavity 18. The incoming air is thus targeted to cool the exhaust components, and the heated exhausted airflow $A_2$ will then exit the exhaust cavity 18 via the spacing or gap between adjacent deflectors 12. As the air flows through the cavity 18, the air will cool the exhaust pipe 20 and muffler 22, rear differential or any other components therein, and thus facilitate heat transfer away from the undercarriage of the vehicle 16. While illustrated specifically for an exhaust system on a vehicle, one skilled in the art will appreciate that the underbody cover according to the disclosure herein could be used for any vehicle system in which both cooling and drag reduction would be beneficial.

Figure 4A:
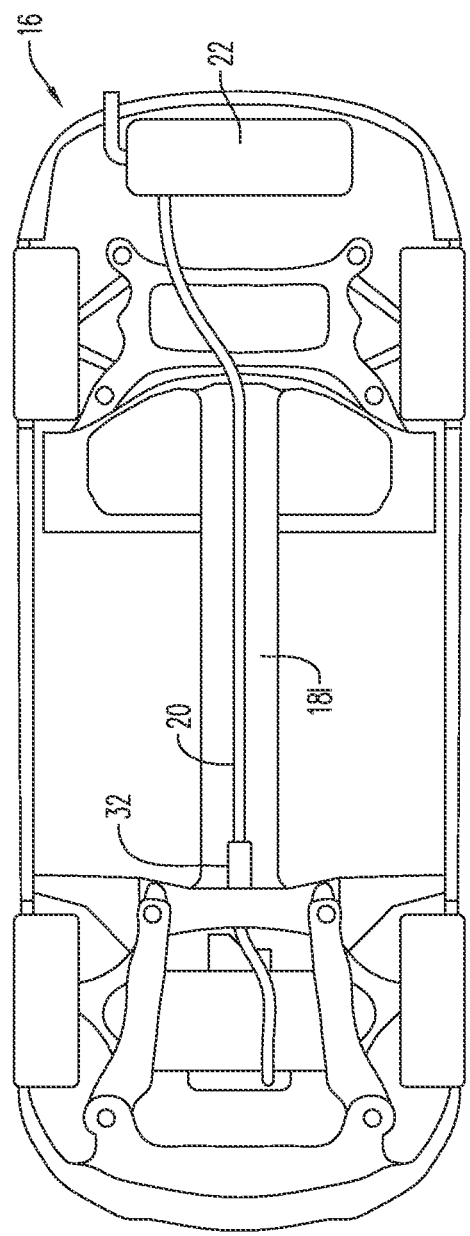
FIG. 4A is a bottom plan view of a conventional vehicle.
Figure 4B:
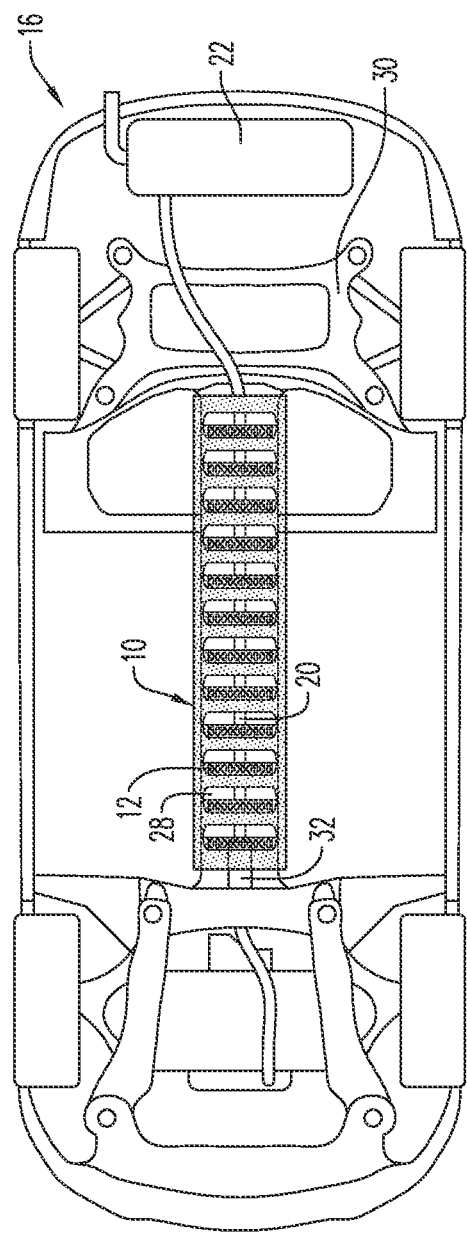
FIG. 4B is a bottom plan view illustrating the vehicle undercover according to the exemplary embodiment of the disclosure when disposed on the vehicle shown in FIG. 4A.

As best understood with reference to FIGS. 4A and 4B, rather than presenting a tunnel or cavity 18 on the underside of the vehicle 16 as illustrated in FIG. 4A, which can create a significant drag on the vehicle when it is in motion, the underbody cover 10 provides a substantially smooth lower surface over which the airflow A will stream, as illustrated in FIG. 4B. The underbody cover 10 thus serves both purposes of reducing aerodynamic drag and allowing for cooling of the underbody components. The exact shape, width and length of the underbody cover 10 will of course vary depending on the parameters of the vehicle on which it is disposed. For example, in the exemplary embodiment of FIG. 3, the muffler 22 is disposed mid-vehicle and within the exhaust cavity 18. In this instance, the muffler 22 is covered by the underbody cover 10 and airflow A assists in dissipating heat from the muffler 22 and the associated exhaust pipe 20. In the exemplary embodiment shown in FIGS. 4A and 4B, the muffler 22 is rearward of the rear drivetrain 30 and the underbody cover 10 is beneath the exhaust pipe 20 and a catalytic converter 32 disposed in the exhaust cavity 18. In this instance, the muffler 22 is not covered by the underbody cover 10 and airflow A assists in dissipating heat from the catalytic converter 32 and the associated exhaust pipe 20.

The size and number of deflectors 12 in the underbody cover 10 can be varied depending upon the particular vehicle requirements just as the number and orientation of the openings 14 in each of the deflectors 12 can also be varied. That is, it is possible the underbody cover 10 may not have any openings in a particular deflector if cooling is not required at a given location or a deflector may have as few as one opening for localized cooling. In the exemplary embodiment shown in FIGS. 1-3, the openings 14 extend generally across the width of the deflectors 12 and are configured for a single exhaust pipe 20 extending down the center of the cavity 18. Possible modifications to this arrangement could be made for a dual exhaust system where there two exhaust pipes are spaced laterally apart and extend along the length of the exhaust cavity 18. With such an exhaust arrangement, openings 14' can be disposed in groupings on each side of the deflector 12' with a middle section 34 of the deflector being solid material, as illustrated in a further exemplary embodiment shown in FIG. 5A. This arrangement allows the air flow to be concentrated over the two exhaust pipes extending along the sides of the exhaust cavity 18 rather than one exhaust pipe in the center as shown in FIG. 4B. Again, while the groupings of openings 14' are shown to include four openings 14' on each side of the middle section 34, this number could be increased or decreased and the size of the openings 14' could be modified as needed to accommodate the particular exhaust system on a vehicle. Still further, in the exemplary embodiment shown in FIG. 5B, the openings 14" can be centralized within the middle of the deflectors 12". With such an arrangement, the airflow would be concentrated over the central area of the exhaust cavity 18 housing a centralized exhaust pipe and/or other exhaust components.

Figure 6:
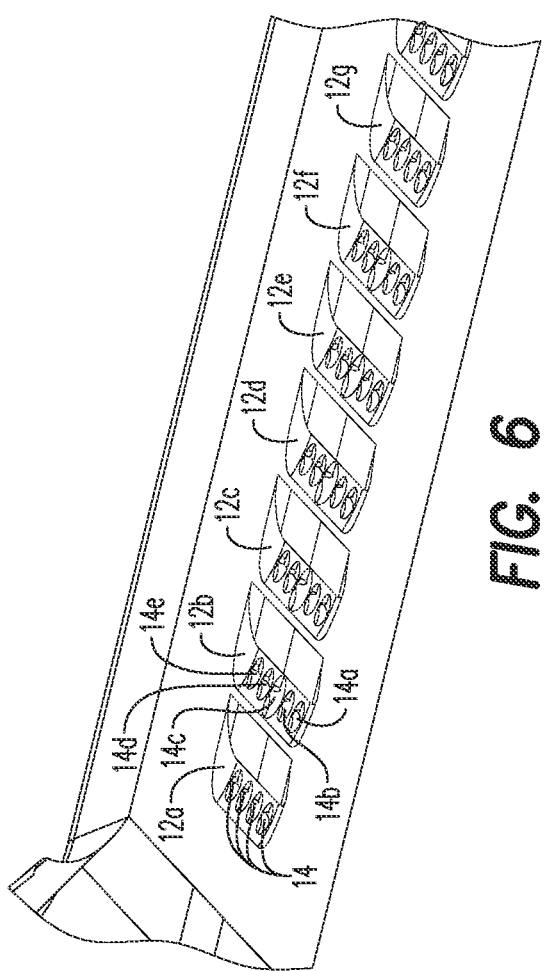
FIG. 6 is front, bottom perspective view of a vehicle undercover according to a third further exemplary embodiment of the disclosure.

Each of the openings 14 illustrated in FIGS. 1-3 is shown to direct airflow in the same direction, that is, generally upwards towards the exhaust pipe and straight relative to the longitudinal axis of the vehicle underbody. The orientation of the openings 14 can be varied, however, as needed to best obtain the desired degree of cooling for a particular vehicle. By way of example, one or more openings along the centerline of a deflector could be configured for airflow in an upward and straight direction, whereas the openings on each side thereof could be upward and angled relative to the longitudinal axis of the vehicle underbody so as to direct the airflow towards the centerline. Referring to the exemplary embodiment shown in FIG. 6, an underbody cover including deflectors 12a-12g is shown. In this example, deflector 12a is similar to those shown above wherein a plurality of openings 14 are disposed across the width of deflector 12a and the openings 14 all direct the airflow in the same direction, that is, in an upward and straight direction, i.e., generally upwards and parallel with the longitudinal axis of the vehicle. Deflectors 12b-12f on the other hand are different both in the number and size of openings and the orientation of the openings. More specifically, in the exemplary embodiment, deflectors 12b-12f include a central opening 14c that is configured with an upward and straight orientation generally parallel to the underbody of the vehicle. Openings 14a and 14b are configured with an upward and angled orientation relative to the longitudinal axis of the vehicle underbody, that is, towards the right side in the illustrated figure so as to direct the airflow upwards and towards the centerline of the underbody cover which generally corresponds to the location of the exhaust pipe. Similarly, openings 14d and 14e are configured with an upward and angled orientation relative to the longitudinal axis of the vehicle underbody, that is, towards the left side in the illustrated figure so as to direct the airflow upwards and towards the centerline of the underbody cover which generally corresponds to the location of the exhaust pipe. The central opening 14c is also sized larger than the remaining openings to increase the airflow at the centerline of the deflector. As should be appreciated from the above discussion, the overall size and configuration of the underbody cover and/or the deflectors, the number and/or size of openings in a deflector and/or the orientation of each of the openings in a deflector can all be varied as needed to increase the airflow to a location where it is most desired based upon the design parameters of a vehicle.

In accordance with an exemplary embodiment of the disclosure, the underbody cover 10 is manufactured from a heat resistant material, such as aluminum or stainless steel for example, but other materials could of course also be used if treated or otherwise configured in the system to accommodate the necessary heat transfer of the system to be cooled. For example, the cover 10 can be formed from coated materials such as a plastic that is coated with a heat reflective material, or other forms of insulation can be provided between the cover and the components. The underbody cover may be a stamped panel but could also be manufactured using other techniques if desired.

Figure 7:
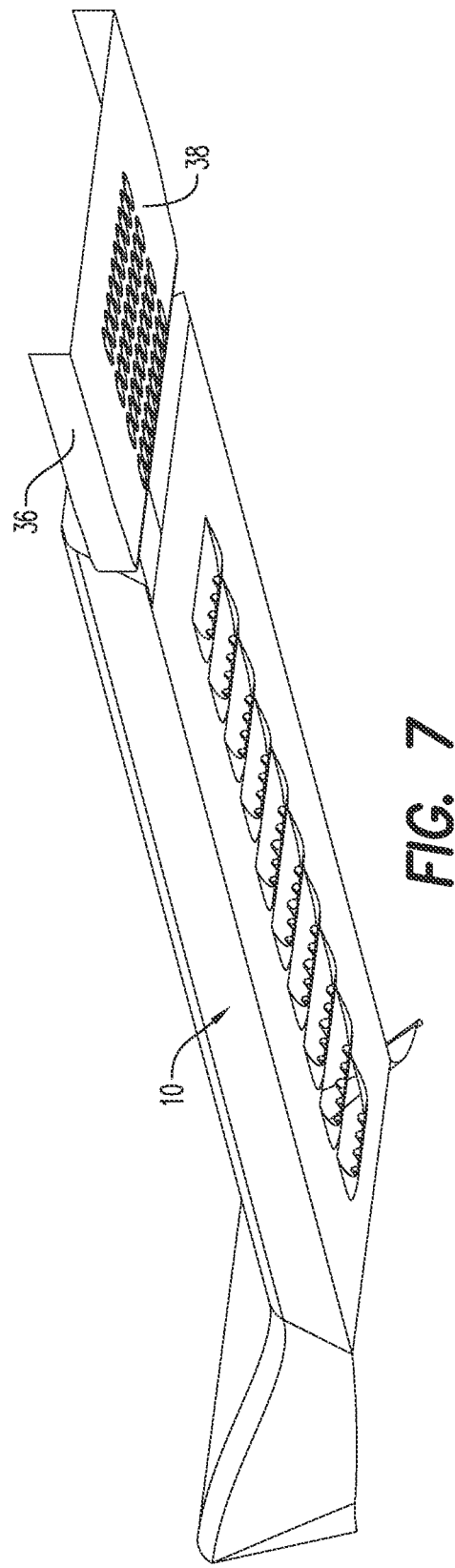
FIG. 7 is rear, bottom perspective view of a vehicle undercover according to a fourth further exemplary embodiment of the disclosure.

The above description has been directed primarily to the use of an underbody cover beneath an exhaust system situated substantially in front of the rear suspension of a vehicle. The underbody cover can be adapted however to also cover additional vehicle components such as pipes and mufflers. By way of example, FIG. 7 illustrates a further embodiment of the disclosure in which an extension cover 36 is provided rearward of the underbody cover 10. Extension cover 36 can extend rearward of the rear suspension so as to cover a rear differential of a vehicle. In such case, extension cover 36 is adapted to move with the differential or sufficient clearance must be provided if it is mounted on the vehicle body. Extension cover 36 is also provided with a plurality of openings 38 configured to allow air flow therethrough.

While various embodiments of the disclosure have been described, the description is intended to be exemplary, rather than limiting and it will be apparent to those of ordinary skill in the art that many more embodiments and implementations are possible that are within the scope of the disclosure. Accordingly, the disclosure is not to be restricted except in light of the attached claims and their equivalents. Also, various modifications and changes may be made within the scope of the attached claims.

We claim:

1. A vehicle comprising:
a vehicle body having an undercarriage; and
an underbody cover attached to the undercarriage of the vehicle body, the underbody cover having a plurality of deflectors each defining a deflector body, the plurality of deflectors being spaced in an axial direction of the vehicle so as to define a predetermined gap between adjacent ones of said plurality of deflectors,
wherein each of said plurality of deflectors includes a plurality of apertures extending through the deflector body and configured to allow airflow through the underbody cover.

2. The vehicle according to claim 1, wherein the undercarriage includes an exhaust cavity configured to receive at least one exhaust component, said underbody cover extending a length of the exhaust cavity and disposed beneath the at least one exhaust component.

3. The vehicle according to claim 2, wherein, when the vehicle is in forward motion, the plurality of apertures are configured such that air flows into the exhaust cavity through the plurality of apertures and air flows out from the exhaust cavity through the predetermined gap between adjacent ones of said plurality of deflectors.

4. The vehicle according to claim 1, wherein the plurality of apertures in each of said plurality of deflectors define scoop shaped passages extending from a forward side of the deflector to a rear side of the deflector.

5. The vehicle according to claim 1, wherein the plurality of apertures in a first one of said plurality of deflectors is different from the plurality of apertures in a second one of said plurality of deflectors.

6. The vehicle according to claim 1, wherein the plurality of apertures in at least one of said plurality of deflectors includes at least one aperture having a first orientation relative to a longitudinal axis of the vehicle and at least one aperture having a second orientation relative to the longitudinal axis of the vehicle.

7. The vehicle according to claim 1, wherein the plurality of apertures in at least one of said plurality of deflectors includes at least one aperture having a first size and at least one aperture having a second size, the first size being different from the second size.

8. An undercover for attachment to an underside of a vehicle, the undercover comprising:
a plurality of deflectors each defining a deflector body and being disposed along an axis of the undercover, the plurality of deflectors being spaced apart to thereby define a predetermined gap between adjacent said deflectors;
wherein at least one of said plurality of deflectors includes one or more apertures extending through the deflector body.

9. The undercover according to claim 8, wherein the plurality of apertures in each of the deflectors are disposed at an upwards angle towards the underside of the vehicle relative to a plane of the vehicle undercover.

10. The undercover according to claim 9, wherein at least one of the plurality of apertures in at least one of the deflectors is disposed at a lateral angle towards a centerline of the vehicle undercover relative to a longitudinal axis of the underside of the vehicle.

11. The undercover according to claim 9, wherein the plurality of apertures in at least one of said plurality of deflectors includes at least one aperture having a first size and at least one aperture having a second size, the first size being different from the second size.

12. The undercover according to claim 9, wherein the plurality of apertures in at least one of said plurality of deflectors includes a first number of apertures and the plurality of apertures in at least another one of said plurality of deflectors includes a second number of apertures, the first number of apertures being different from the second number of apertures.

13. The undercover according to claim 9, wherein the plurality of deflectors are configured for airflow to pass through the plurality of apertures in a first direction relative to the vehicle and for airflow to pass through the predetermined gap between adjacent said deflectors in a second direction relative to the vehicle, the first direction being different from the second direction.

14. The undercover according to claim 8, wherein the plurality of apertures on at least one of said plurality of deflectors are arranged in a first grouping on a first side of the at least one deflector and in a second grouping on a second side of the at least one deflector, a middle portion of the deflector being defined between the first grouping and the second grouping, and the middle portion being devoid of apertures.

15. A method of cooling a vehicle exhaust system, the vehicle exhaust system including at least one exhaust component disposed within an exhaust cavity on an underbody of a vehicle, the method comprising:

provides a vehicle undercover having a plurality of spaced deflectors defining a predetermined gap between adjacent deflectors, each of said plurality of deflectors including a deflector body and a plurality of apertures extending through the deflector body; and positioning the vehicle undercover beneath the at least one exhaust pipe and attaching the vehicle undercover to the underbody of the vehicle.

16. The method according to claim 15, further comprising forming the plurality of apertures to direct air upwards towards the underside of the vehicle when the vehicle is in forward motion.

17. The method according to claim 16, further comprising forming at least one of the plurality of apertures in at least one of the deflectors to direct air at a lateral angle towards a centerline of the vehicle undercover relative to a longitudinal axis of the underside of the vehicle when the vehicle is in forward motion.

18. The method according to claim 15, wherein providing the vehicle undercover includes forming the plurality of apertures in said plurality of deflectors to define scoop shaped passages extending from a forward side of each said deflector to a rear side of each said deflector.

19. The method according to claim 15, wherein providing the vehicle undercover includes forming a first plurality of apertures in at least one of said plurality of deflectors and forming a second plurality of apertures in at least another one of said plurality of deflectors, the first plurality of apertures being different from the second plurality of apertures.

20. The method according to claim 15, further comprising airflow passing through the plurality of apertures in a first direction relative to the vehicle and airflow passing through the predetermined gap between adjacent said deflectors in a second direction relative to the vehicle, the first direction being different from the second direction, when the vehicle is in motion.

* * * * *